Dec. 19, 1944.   O. R. ROGERS   2,365,218
ELECTRICAL INDICATING AND MEASURING APPARATUS
Filed March 27, 1943   3 Sheets-Sheet 1

Dec. 19, 1944.   O. R. ROGERS   2,365,218
ELECTRICAL INDICATING AND MEASURING APPARATUS
Filed March 27, 1943   3 Sheets-Sheet 3
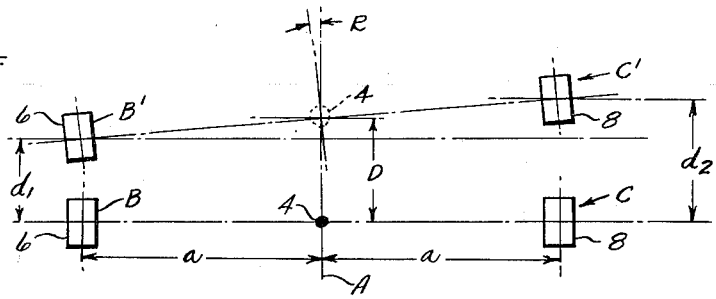
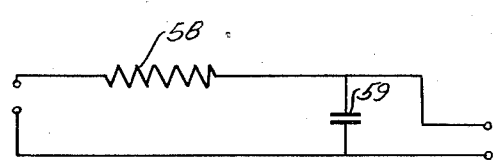
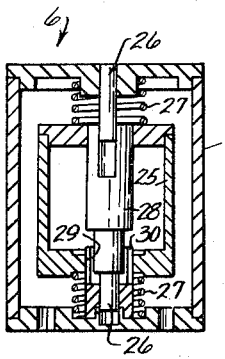
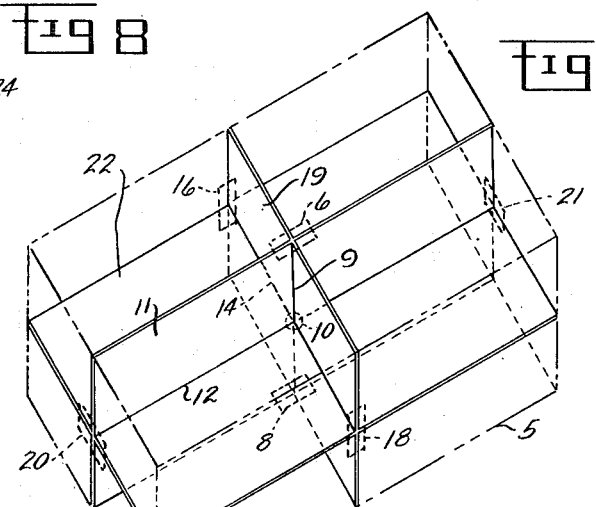
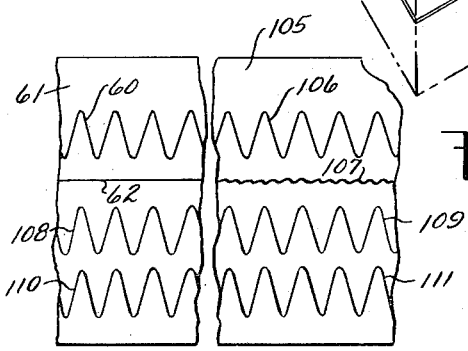
INVENTOR
ORVILLE R. ROGERS Patented Dec. 19, 1944

2,365,218

UNITED STATES PATENT OFFICE 2,365,218

ELECTRICAL INDICATING AND MEASURING APPARATUS

Orville R. Rogers, Dayton, Ohio

Application March 27, 1943, Serial No. 480,872

12 Claims. (Cl. 73—70)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to electrical indicating and measuring apparatus and more particularly to a method of and means for accomplishing simultaneously both the addition and the subtraction of a plurality of independent voltages. The apparatus and method of the invention have particular application to vibration wave separation and, more specifically, to vibration analysis involving extracting of translational and rotational components of vibration of a body.

It is the primary object of the invention to provide a method and apparatus by which a plurality of separately produced voltages may be simultaneously added and subtracted electrically.

A further object of the invention is to provide a method and apparatus capable of enabling simultaneous visual reproduction and/or recording of the concurrent instantaneous sums and differences of a plurality of concurrent instaneous voltages on a single record wherein the instantaneous sums and differences are graphically related to a common time base.

Another object of the invention is to provide a method and apparatus capable of enabling simultaneous visual reproduction and/or recording of a plurality of concurrent instantaneous voltages and the concurrent instantaneous sums and differences of said voltages all on a single record wherein the individual concurrent instantaneous voltages and the concurrent instantaneous sums and differences of said voltages are all graphically related to a common time base.

Another object of the invention is to provide a method and apparatus for simultaneously extracting electrically the concurrent translational and rotational components of vibration of a body in a given plane.

Another object of the invention is to provide a method and apparatus for simultaneously visually reproducing facsimiles of the concurrent translational and rotational components of vibration of a body in a given plane.

In the study of vibrational characteristics of a rigid body it is known that vibratory motion of the body as a whole may be resolved into two components of vibration (a translational component and a rotational component) along and about each of three coordinate axes fixed in space by which the vibratory motion of the body with reference to its six degrees of freedom may be completely determined. By mounting vibration pickups upon a rigid body in pairs with each pair related to one of the aforesaid coordinate axes passing through the center of gravity of the body, alternating voltages corresponding with the respective rotational and translational components of vibration at the locations of the respective vibration pickups may be produced, and these voltages properly analyzed will serve to indicate the translational and rotational components of vibration of the body along and about said axes. The addition of the components of vibration at two points on either side of the center of gravity and related to one of the coordinate axes will serve to indicate the translational motion of the center of gravity of said body along one axis while the subtraction of these components of vibration at the same two points will serve to indicate the rotational component of motion of said body in a plane about an axis normal to the plane of the pickup axes.

It has been heretofore proposed in the art to convert the components of vibration of a body along and about the respective coordinate axes into electrical voltages by means of vibration pickups and to add and subtract said voltages whereby to provide an indication of the translational and rotational components of vibratory motion along and about said axes. However, it has been necessary in connection with the apparatus heretofore proposed in the art to separately obtain, in successive stages, the respective additions and subtractions of the respective voltages corresponding with the respective components of vibration represented thereby. It was not possible with the apparatus heretofore proposed in the art to obtain simultaneous addition and sub action of the same individual voltages.

It was not, therefore, possible heretofore to extract electrically the simultaneous or concurrent translational and rotational components of vibration of a body in a particular plane, because said respective components would never be concurrent to cover the same period since the additions and subtractions respectively corresponding to said components were required to be accomplished electrically in successive stages. The desirability of obtaining simultaneous additions and subtractions directly by electrical means, so as to eliminate the need for mathematical calculation thereof, has been recognized and it has been a primary purpose in the development of the present invention to provide apparatus wherein such simultaneous addition and subtraction of the same individual voltages could be obtained electrically whereby to enable the production of an indication, or a record of the simultaneous or concurrent sums and differences of said voltages for the purpose of extracting the simultaneous or concurrent translational and rotational vibration components in a given plane respectively proportional to the simultaneous or concurrent sum and difference of said individual voltages.

In one aspect, therefore, the invention hereof resides in the provision of a means and method whereby the separate electrical additions and subtractions, formerly required to be obtained in successive stages (a separate addition stage and a separate subtraction stage) may now be obtained simultaneously by electrical means.

To this end the present invention essentially contemplates the employment of an electrical impedance bridge with the input and output terminals arranged in such a manner that when a plurality of alternating voltages are impressed upon the bridge, the latter continuously generates across one output a voltage proportional to the instantaneous sum of the applied voltages and simultaneously generates across the other output a voltage proportional to the instantaneous difference between the applied voltages.

In another aspect, the invention resides in the simultaneous electrical extraction of the concurrent translational and rotational components of vibration of a body in a given plane.

Other objects, advantages and features of novelty will appear as the description of the invention proceeds in conjunction with the accompanying drawings, in which:

Figure 3 is a diagrammatic view of a modified low impedance circuit arrangement wherein provision is made for simultaneous indication of the additions and subtraction of the applied voltages and of the individual voltages so added and subtracted.

Figure 4 is a diagrammatic representation of the method of deriving translational and rotational components of vibratory motion in one plane along and about one of the three coordinate axes through the center of gravity of a rigid body.

Figure 1:
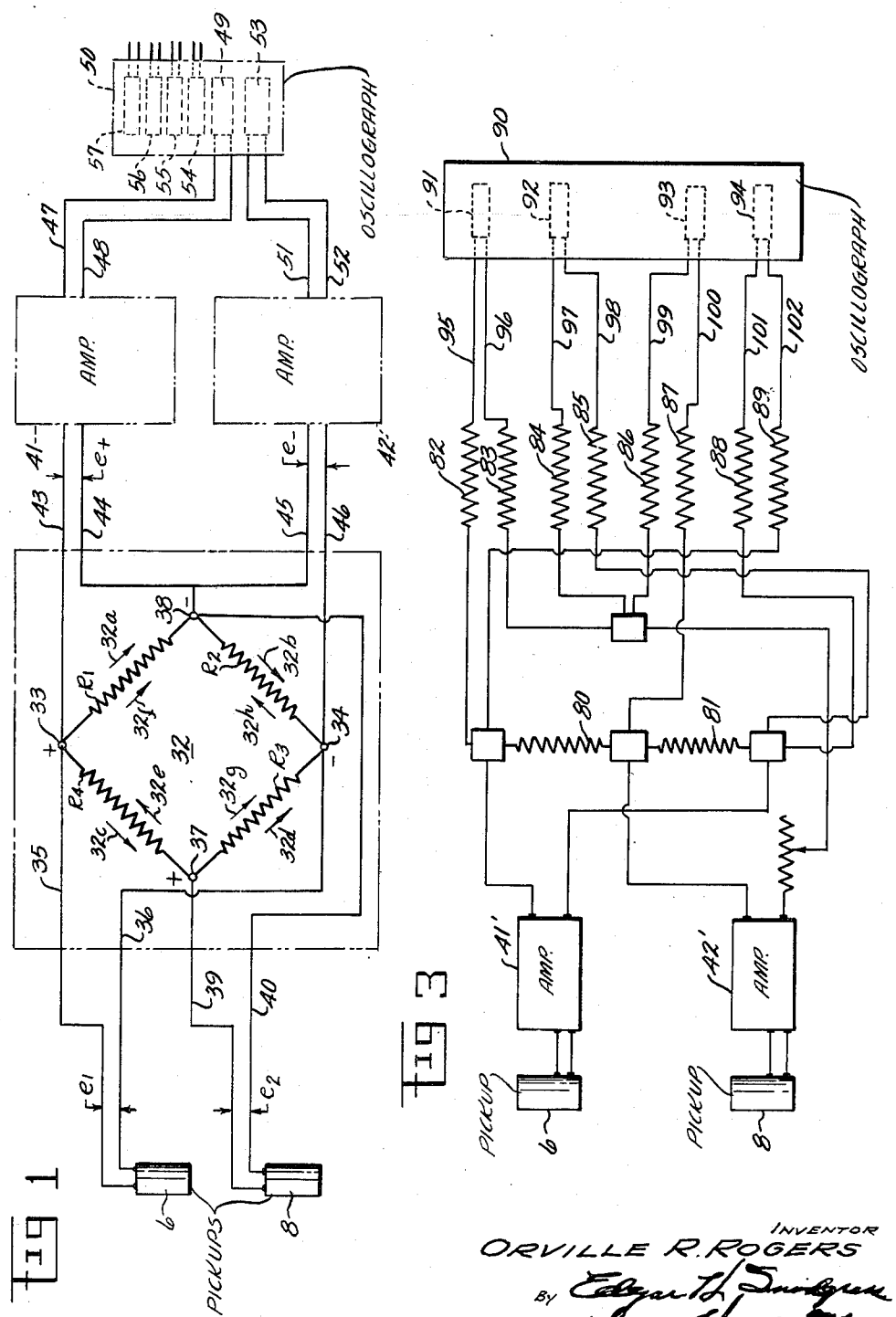
Figure 1 is a diagrammatic view illustrating a fundamental circuit and arrangement of apparatus for the simultaneous addition and subtraction of two concurrent alternating voltages and for the visual reproduction or recording of said additions and subtractions.

Figure 5 is a perspective view of a solid body illustrating the manner in which vibration pickups may be mounted in pairs with reference to the three coordinate axes for the purpose of translating the entire vibratory motion of the center of gravity of said body into terms of electrical voltages proportional to the translational and rotational components of motion of the center of gravity along and about said three coordinate axes.

Figure 6 is a diagram of an integrating circuit which may be employed in conjunction with the apparatus of the invention.

Figures 7 and 7A are views showing sample oscillograph records obtained by the use of the apparatus of the invention.

Figure 8 is a sectional view of one type of inertia-operated electromagnetic vibration pickup suitable for use in carrying the invention into practice.

The necessity of obtaining more detailed knowledge of the vibratory motion of aircraft power plants in connection with the efficiency of vibration isolating engine mounts and calculation of the flutter parameters has brought about development of vibration wave separating instruments that electrically add and subtract the voltage facsimiles of vibratory motion. Vibration pickup units measure the motion of their points of attachment. By adding and subtracting the output voltages of a pair of such pickups the motion of inaccessible points in the plane of the pickups may be derived. The apparatus for adding and subtracting the pickup voltages is here referred to as an electrical vibration wave separator. The vibration wave separator records data in terms of quantities of primary interest, not only the displacements of the points of attachment of the pickups, but also displacements of points remote from said points of attachment.

A case of considerable practical importance is the measurement of the vibratory motion of an elastically suspended aircraft power plant. If the power plant is considered as a rigid body, its motion can be derived by a translation of its center of gravity and a rotation about its center of gravity. Attaching pickup units to the center of gravity is impracticable. However, the motion of the center of gravity may be measured by the apparatus of the invention in conjunction with vibration pickups attached to accessible points of the power plant.

The translation of the center of gravity of the power plant can be resolved into components along three coordinate axes fixed in space. The rotation can be resolved into components about the same three coordinate axes. Consequently the most general vibratory motion of such a rigid body will be completely determined by continuous records of vibratory displacements and oscillations along and about respectively three coordinate axes intersecting at the center of gravity of the body. Vibratory motion is periodic so that records of continuous motion along and about the coordinate axes for one period of the resultant disturbance will completely describe the vibratory motion of the power plant in space. These records may be obtained from six linear vibration pickups (of a type such as illustrated, for example, by Figure 8) distributed in pairs about the center of gravity of the power plant, each pair of pickups being parallel to one of the three coordinate axes and the units of each pair located so that the center of gravity is between them.

Referring to Figure 4 which illustrates the scheme of measurement of the translational and rotational components of vibration of a rigid body in one plane along and about one of the coordinate axes, the letter A represents one axis intersecting the center of gravity 4, the vibratory motion of which in the plane of the paper is desired to be measured or indicated. Vibration pickups 6 and 8 are represented as being located at positions B and C, each a distance $a$ from the center of gravity 4. Suppose that at some instant the body has vibrated so that the pickups are in positions B' and C'. The point 4 has translated through a distance D and if the motion of the pickup 6 from position B to position B' is $+d_1$ and the motion of the other pickup 8 from position C to position C' is $+d_2$ (the plus signs indicating motion in a positive direction) then $D$ equals $\frac{1}{2}(d_1+d_2)$. There has been a rotation R about the point 4 which is:

$$R = \text{arc tan. } \tfrac{1}{2}a\,(d_2-d_1)$$

For small angles encountered in vibration work tan $R=R$; hence, $R=\frac{1}{2}a\,(d_2-d_1)$.

Thus a continuous addition of displacements $(d_1, d_2)$ if multiplied by the factor $\frac{1}{2}$ will give a continuous record of linear vibrations of the center of gravity 4 in the direction of the axis A. Similarly a continuous subtraction of displacements $(d_1, d_2)$, if multiplied by the factor $\frac{1}{2}a$ will give a continuous record of torsional oscillations of the body about an axis perpendicular to the plane of the paper. In order to derive a complete picture of the vibratory motion of the center of gravity of a rigid body, similar measurements of the displacements of the center of gravity with reference to three coordinate axes will be required to be made. The positioning of the pickups for this purpose with reference to three coordinate axes fixed in space and intersecting the center of gravity of a rigid body generally designated by the numeral 5 is illustrated in Figure 5.

In Figure 5 a rigid body is represented at 5. The pickups 6 and 8 are located on the vertical axis 9 equidistantly from the center of gravity 10 and the pickup axes are parallel to and in the vertical plane 11 of the longitudinal axis 12. The addition of the displacements of the pickups 6 and 8 will indicate the translational motion of the center of gravity 10 in the direction of the longitudinal axis 12 in the plane 11; the subtraction of the displacements of the pickups 6 and 8 will indicate the rotation of the body 5 about the transverse axis 14 in the plane 11. The pickups 16 and 18 are located on the transverse axis 14 equidistantly from the center of gravity 10 and the pickup axes are parallel to and in the transverse plane 19 of the vertical axis 9. The addition of the displacements of the pickups 16 and 18 will indicate the translational motion of the center of gravity 10 in the direction of the vertical axis 9 in the plane 19; the subtraction of the displacements of the pickups 16 and 18 will indicate the rotation of the body 5 about the longitudinal axis 12 in plane 19. The pickups 20 and 21 are located on the longitudinal axis 12 equidistantly from the center of gravity 10 and the pickup axes are parallel to and in the horizontal plane 22 of the longitudinal axis 12. The addition of the displacements of the pickups 20 and 21 will indicate the translation of the center of gravity 10 in the direction of the transverse axis 14 in the plane 22; the subtraction of the displacements of the pickups 20 and 21 will indicate the rotation of the body 5 about the vertical axis 9 in the plane 22.

For the purposes of this invention it is preferred to employ linear vibration pickups such as the inertia-operated electromagnetic type of vibration pickup illustrated in Figure 8. This particular vibration pickup unit comprises an outer case 24 which serves as the supporting element and carries the seismic element 25 guided by the small rods 26. Interposed between the seismic element 25 and the case 24 are springs 27. The seismic element 25 includes a permanent magnet 28 and an annealed iron structure which serves to set up an intense magnetic field in the annular gap 29. A coil of fine wire 30 is fastened rigidly to the case 24 and projects through the gap 29 extending well beyond the limits of relative motion of the case and seismic element so that the total amount of magnetic flux passing through the winding is constant. The vibration pickup unit 6 of Figure 8 is mounted on a vibrating member by securing the case 24 thereto. When so mounted relative motion between the case 24 and the seismic element 25 produces a voltage in the coil 30 which is proportional to the vibration velocity.

From the foregoing it will be seen that when vibration pickups such as illustrated in Figure 8 are mounted as illustrated in Figure 5, the vibration displacements of the pickups are converted into voltages proportional to the vibration velocity. The addition and subtraction of the voltages produced by any pair of pickups 6 and 8, or 16 and 18, or 20 and 21, will produce respective translational and rotational components of vibration of the body 5 in a given plane. If the pickups are of the type illustrated in Figure 8, the respective indications of translational and rotational components of vibration will be in terms of displacement velocity and in such event, if it is desired to have the indications in terms of displacement rather than velocity, an integrating circuit, a common type of which is illustrated in Figure 6 may be employed as hereinafter described. It is, of course, within the purview of this invention to employ vibration pickups which directly convert the displacements thereof into voltages proportional to displacement rather than displacement velocity. Extraction of translational and rotational components in all three planes indicated in Figure 5 will completely describe the vibratory motion of the body. To this end simultaneous addition and subtraction of the outputs of each of three pairs of vibration pickups mounted as indicated in Figure 5 may be carried out to extract the concurrent translational and rotational components of vibration in each of said three planes.

For the purpose of simultaneously adding and subtracting electrically the voltages produced by each pair of pickups 6 and 8, 16 and 18, and 20 and 21, and of obtaining a continuous record of the simultaneous additions and subtractions, each such pair of pickups is connected in a circuit arrangement such as shown in Figure 1. Now referring to Figure 1, one pair of vibration pickups, such as 6 and 8, have their outputs connected to an electrical impedance bridge generally indicated at 32, the output $e_1$ of vibration pickup 6 being connected to the bridge circuit 32 at 33 and 34 through wires 35 and 36 respectively, and the output $e_2$ of vibration pickup 8 being applied to the bridge circuit 32 at terminals 37 and 38 through wires 39 and 40, respectively. The outputs of the bridge circuit 32 are applied respectively to amplifiers 41 and 42, the bridge output $e+$ being applied to amplifier 41 through wires 43 and 44 and the bridge output $e-$ being fed to the amplifier 42 through wires 45 and 46. The output of amplifier 41 is applied through wires 47 and 48 to one reflecting galvanometer element 49 of the recording oscillograph 50. The output of amplifier 42 is fed through wires 51 and 52 to a second reflecting galvanometer element 53 of said recording oscillograph 50 which may be of the type illustrated at pages 284–285, of the May 1937 issue of the Journal of Aeronautical Sciences.

The oscillograph 50 is represented as comprising four additional reflecting galvanometer elements 54, 55, 56 and 57 and it will be understood that the outputs of the two additional pairs of vibration pickups 16, 18, and 20, 21 mounted on a rigid body, as indicated for example in Figure 5, may have the outputs of each such pair of pickups applied to individual bridge circuits such as 32 in the same way as the outputs of pickups 6 and 8 are applied to that bridge circuit, and the outputs of the additional bridge circuits for each pair of vibration pickups 16, 18 and 20, 21, will be applied to separate amplifiers in the manner indicated in Figure 1 and the outputs of said amplifiers applied respectively to one or the other of the reflecting galvanometer elements 54, 55, 56 and 57 of the recording oscillograph 50. In other words, the outputs of the pair of vibration pickups 16 and 18 may be applied to a separate bridge circuit such as 32 and the outputs of such separate bridge circuits fed through a second set of amplifiers respectively to two of the reflecting galvanometer elements such as 54 and 55 of the same recording oscillograph 50 shown in Figure 1. Likewise the outputs of respective pickups 20 and 21 may be applied to a third separate bridge circuit such as 32 and the outputs of such third separate bridge circuit applied through a third set of amplifiers respectively to the reflecting galvanometers 56 and 57 of the same oscillograph 50 indicated in Figure 1. Thus a single recording oscillograph 50 may serve to indicate the concurrent translational and rotational components in three respective planes of a rigid body such as 5 shown in Figure 5.

The bridge circuit 32 comprises a balanced impedance bridge and as shown in Figure 1 may consist of resistances $R_1$, $R_2$, $R_3$, and $R_4$, each comprising a respective arm of the bridge 32, each arm being of equal effective impedance value. As a matter of practice the resistances $R_1$, $R_2$, $R_3$, and $R_4$ may not necessarily actually be of the same value since, for instance the resistors $R_1$, and $R_2$ will necessarily be adjusted so that impedance comprising $R_1$ or $R_2$ in parallel with the input impedance of the amplifiers 41 or 42 will be equivalent to either of the arms comprising resistors $R_3$ or $R_4$. Nevertheless when so adjusted the effective impedance values of the four arms of the bridge represented by resistors $R_1$, $R_2$, $R_3$ and $R_4$ are equal.

The voltage $e+$ existing across the resistor $R_1$ constitutes in practical terms an addition of the individual voltages $e_1$ and $e_2$ produced by the respective vibration pickups 6 and 8, while the voltage $e-$ existing across the resistor $R_2$ constitutes in practical effect a subtraction of the individual voltages $e_1$ and $e_2$. In explanation of the foregoing it may be stated that the essential network of the vibration wave separator can be considered as made up of three loops or circuits through which current may flow. The first loop involves the pickup 6 and consists of wire 35 to input 33, resistor $R_1$, resistor $R_2$ and wire 36 to pickup 6. The second loop involves pickup 8 and consists of wire 39 to input 37, resistor $R_4$, resistor $R_1$ and wire 40 back to the pickup 8. The third loop involves the four arms of the bridge itself comprising the resistors $R_1$, $R_2$, $R_3$ and $R_4$.

Now for the purpose of understanding the theory of operation of the circuit of Figure 1 in respect to the simultaneous addition and subtraction of the individual voltages produced by the respective pickups 6 and 8, let it be assumed that the voltage $e_1$ produced by pickup 6 is, at a given moment, positive at the bridge input 33 and negative at the bridge input 34, and that the voltage $e_2$ produced by the pickup 8 is, at the same moment, positive at bridge input 37 and negative at bridge input 38. Considering only the circuit including the vibration pickup 6 through the bridge comprising the resistors $R_1$, $R_2$, $R_3$ and $R_4$, if the voltage is positive at input 33 and negative at input 34, the current will flow from input 33 through the bridge to input 34 in the manner indicated by and in the direction of the arrows designated as 32a and 32b, and 32c and 32d. In other words, the current will flow from input 33 through resistance $R_1$ and resistance $R_2$ to input 34 and the current will also flow from input 33 through resistance $R_4$ and resistance $R_3$ to input 34. Now considering the circuit including vibration pickup 8 through the balanced resistance bridge 32, if the voltage at the input 37 is positive and the voltage at input 38 is negative, the current will flow through the bridge 32 in the manner indicated by and in the direction of the arrows designated at 32e and 32f, and 32g and 32h. In other words the current will tend to flow from input 37 through resistance $R_3$ and resistance $R_2$ to input 38. The current will also tend to flow from input 37 through resistance $R_4$ and resistance $R_1$ to input 38. Now it will be seen from the foregoing that the current resulting from the voltage $e_1$ produced by the vibration pickup 6 and the current resulting from voltage $e_2$ produced by the vibration pickup 8 flow in the same direction through the resistors $R_1$ and $R_3$ as indicated by arrows 32a, 32f and arrows 32d, 32g and the currents produced by said pickups tend to flow in opposite directions through resistors $R_4$ and $R_2$ as indicated by arrows 32c, 32e and arrows 32b, 32h so that effectively the voltage across resistance $R_1$ constitutes an addition of the individual voltages produced by the respective vibration pickups 6 and 8 and the voltage across resistance $R_2$ effectively constitutes a subtraction of the individual voltages produced by said pickups 6 and 8.

The operating theory of the wave separator may be described mathematically as follows: The pickup units 6 and 8 in Figure 1 are units of a parallel pair as previously described. If the pickup 6 is subjected to a vibration $d_1 \sin wt$ and pickup 8 is subjected to a vibration $d_2 \sin wt$, respectively, they generate voltages $e_1$ and $e_2$ which are applied simultaneously to the vibration wave separator (bridge circuit 32) inputs 33, 34 and 37, 38;

$$e_1 = S_1 d_1 w \cos wt$$
$$e_2 = S_2 d_2 w \cos wt$$

These equations for $e_1$ and $e_2$ result from the fact that the voltages produced by moving coil pickups are proportional to the relative velocity between the coil 30 and the magnetic field comprising the case 24 (Figure 8). The quantities $S_1$ and $S_2$ are peak volts per inch of double amplitude of vibration constants of the pickups. If $R_1 = R_2 = R_3 = R_4 = R$ and $i_1$ is the current flowing in the circuit from the pickup 6 through the bridge circuit 32, $i_2$ is the current flowing in the circuit comprising the resistors $R_1$, $R_2$, $R_3$ and $R_4$, and $i_3$ is the current flowing in the circuit from the pickup 8 through the bridge, the voltage drop across $R_1$ comprising the outputs 43 and 44 is:

$$e_+ = R(i_1 + i_2 + i_3)$$

and the voltage drop across $R_2$ comprising the other output 45, 46 is:

$$e_- = -R(i_1 + i_2)$$

The following equations can be written for the network:

$$e = R(i_1 + i_2 + i_3) + R(i_1 + i_2)$$
$$e_2 = R(i_2 + i_3) + R(i_1 + i_2 + i_3)$$
$$0 = R(i_1 + i_2 + i_3) + R(i_1 + i_2) + R i_2 + R(i_2 + i_3)$$

These can be solved for the currents $i_1$, $i_2$ and $i_3$ with the result that:

$$i_1 = e_1 / R$$
$$i_2 = \frac{-(e_1 + e_2)}{2R}$$
$$i_3 = e_2 / R$$

The voltages at the outputs, $e_+$ and $e_-$ become $$e_+ = \frac{e_1 + e_2}{2}$$

$$e_- = \frac{e_2 - e_1}{2}$$

If linear vibration pickups of the type illustrated in Figure 8 are employed for the purposes of the invention, the voltages produced by the respective pickups will be proportional to vibration velocity rather than proportional to displacement. In order that the indications of translational and rotational components of vibration produced by the respective reflecting galvanometer elements of the oscillograph 50 may be in terms of translational and rotational displacements rather than vibration velocity in the respective planes, an integrating circuit may be employed to convert the respective voltages from voltages proportional to velocity to voltages proportional to displacement. A common type of integrating circuit suitable for the purpose is illustrated in Figure 6 and consists of a resistance 58 and condenser 59 in series. The action of the integrating circuit depends upon the fact that the voltage across the terminals of a condenser is proportional to the time integral of the current flowing into the condenser. Thus if the current flowing into the condenser is made proportional to the output voltage from a vibration pickup unit, the amplified voltage across the condenser will produce a voltage proportional to displacement of the vibration pickup. An integrating circuit such as illustrated in Figure 6 may be incorporated in each of the amplifiers 41 and 42 in the circuit arrangement of Figure 1 if the pickups 6 and 8 are linear vibration pickups.

In respect to the arrangement of Figure 1, since the output $e+$ of the impedance bridge 32 effectively constitutes an addition of the voltages produced by vibration pickups 6 and 8, the galvanometer element 49 will produce an indication of such addition such as represented for example by the line 60 on the oscillograph record 61 of Figure 7. Assuming that the pickups 6 and 8 are mounted upon a rigid body 5 as indicated in Figure 5, the line 60 on oscillograph record 61, produced by the output $e+$ applied to galvanometer element 49, would indicate the translational component of vibration in the direction of the axis 12 in the plane 11 with respect to the body 5 of Figure 5. Similarly in respect to Figure 1 since the output $e-$ effectively represents a subtraction of the outputs of pickups 6 and 8, the galvanometer element 53 would produce an indication such as represented by the line 62 of oscillograph record 61 indicating the rotational component of vibration about the axis 14 in the same plane 11 of Figure 5.

Figure 2:
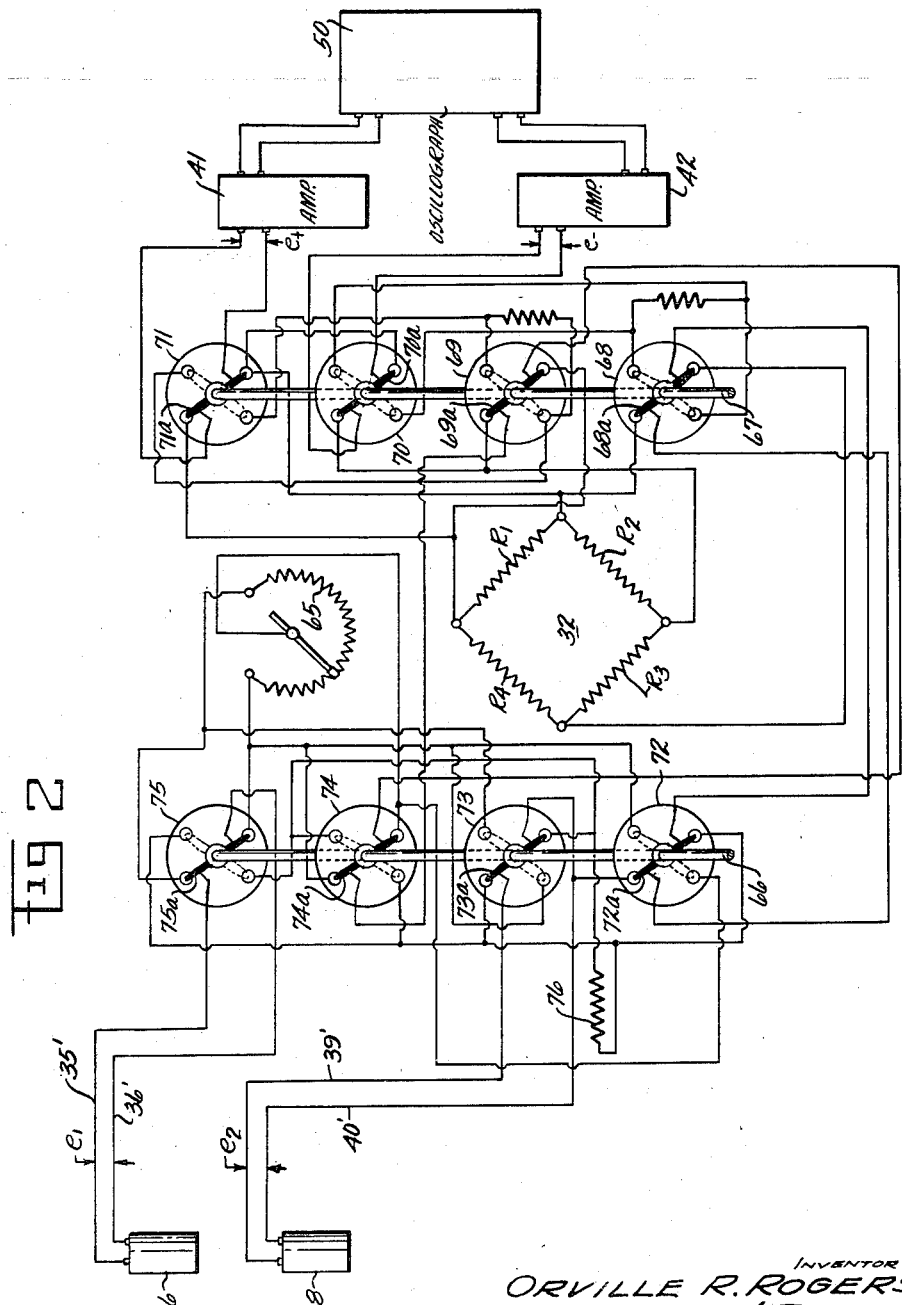
Figure 2 is a diagrammatic view of a somewhat more elaborate circuit arrangement embodying provision for the balancing of the selectivities of the vibration pickups supplying the voltages to be simultaneously added and subtracted.

Figure 2 illustrates a modification of the fundamental circuit of Figure 1 in respect to the incorporation of means for balancing the sensitivities of the respective vibration pickups of a parallel pair. To this end a balancing potentiometer 65 is provided which operates in conjunction with a balancing selector switch 66 so that if the sensitivity of one pickup unit 6 or 8 is less than that of another, the output voltages of said pickup units may be adjusted to the same ratio as the ratio between the pickup sensitivities so that the recorded displacements are directly convertable into actual motion. In order that the device operate at maximum sensitivity the higher output voltage of the more sensitive pickup is reduced to the maximum output voltage of the less sensitive unit. In Figure 2 the outputs 35′, 36′ represent the connections from one pickup 6 of the parallel pair, while the outputs 39′, 40′ represent the connections from the other pickups 8 of said pair. The circuit selector switch 67 isolates the adding and subtracting network and the balance selector switch 66 selects the pickup to be used as the standard. Circuit selector switch 67 comprises a gang switch made up of individual stationary switch members 68, 69, 70, 71 and contact members 68a, 69a, 70a, 71a mounted on a single shaft so as to operate simultaneously.

The selector switch 66 likewise is a gang switch made up of individual stationary switch members 72, 73, 74, 75 and contact members 72a, 73a, 74a, 75a mounted on a single shaft for operation simultaneously. In the full line positions of the contact members of selector switch 67 the pickup voltages applied to inputs 35′, 36′ and 39′, 40′ are simultaneously added and subtracted by the network in the device as described with reference to Figure 1. In the dotted line positions of the contact members of selector switch 67 the adding and subtracting network 32 is isolated and the individual pickups operate directly into the amplifiers 41 and 42. The balance selector switch 66 may now be operated to adjust the output of one of the pickups to the output of the other pickup. In the dotted line position selector switch 66 adjusts the output of one pickup 8 to agree with the output of the other pickup 6. In this instance pickup 8 works into potentiometer 65 and pickup 6 works into resistance 76. In the full line position of the selector switch 66 the output of the pickup 6 is adjusted to agree with the output of the pickup 8. In this instance the pickup 6 works into potentiometer 65 and pickup 8 worked into resistance 76. The selector switch 66 will be operated to the respective positions depending upon which of the pickups has the greater sensitivity. The pickup having the greater sensitivity is adjusted to the pickup of the lesser sensitivity, the selector switch 66 selecting the pickup to which adjustment is to be made. Then the balancing potentiometer 65 is adjusted to reduce the sensitivity of the other pickup to bring the pickups into balance. When the proper balancing adjustment of the pickup has been made, the circuit selector switch 67 is operated to the full line position applying the pickup outputs to the impedance bridge 32, as described in reference to Figure 1.

Figure 3 illustrates a modification of the fundamental arrangement of Figure 1 wherein the addition and subtraction of the respective pickup voltages as well as the individual pickup voltages themselves may be simultaneously recorded in parallel relation on a single oscillograph record such as shown in Figures 7 or 7a.

In the arrangement of Figure 3 the impedance bridge circuit is of the low impedance type which works directly into the oscillograph. Therefore, the amplifiers 41′ and 42′ are placed ahead of the impedance bridge so that the pickups 6 and 8 work directly into said amplifiers. In the arrangement of Figure 3 the resistor 80 constitutes one arm of the impedance bridge equivalent to the arm designated R₄ in Figure 1 and resistor 81 of Figure 3 constitutes another arm of the impedance bridge equivalent to the arm designated R₃ in Figure 1. The resistors 82 and 83, of Figure 3, in series with the internal impedance of the galvanometer element 91 constitute a third arm of the impedance bridge equivalent to the arm designated $R_1$ in Figure 1. The resistors 84 and 85, in series with the internal impedance of the galvanometer element 92, constitute the fourth arm of the impedance bridge of Figure 3 equivalent to the arm designated $R_2$ in Figure 1. The resistors 86 and 87 are in series with the amplifier 42′ and with the internal impedance of galvanometer element 93 and the resistors 88 and 89 are in series with the amplifier 41′ and with the internal impedance of galvanometer element 94. The impedance of resistors 86 and 87, together with the internal impedance of element 93, is equivalent to the impedance of resistors 80 or 81. The impedance of resistors 88 and 89, together with the internal impedance of element 94, is likewise equivalent to the impedance of resistors 80 or 81.

In this arrangement of Figure 3 the oscillograph 90 is represented as comprising four reflecting galvanometer elements 91, 92, 93 and 94, the add output $e+$ of the impedance bridge circuit effectively constituting an addition of the outputs of pickups 6 and 8 in this instance is applied through wires 95 and 96 to galvanometer element 91, while the subtract output $e-$ of the bridge circuit effectively constituting a subtraction of the outputs of pickups 6 and 8 in this instance is applied to galvanometer element 92 through wires 97 and 98. The individual output of vibration pickup 8 is applied through wires 99 and 100 to galvanometer element 93 and the individual output of vibration pickup 6 is applied through wires 101 and 102 to galvanometer element 94.

It will be understood that if linear vibration pickups of the type illustrated in Figure 8 are used in connection with the arrangement of Figure 2 or 3, an integrating circuit such as that shown in Figure 6 will be incorporated in each of the amplifiers in each instance.

The oscillograph records 61 and 105 of Figures 7 and 7a respectively are examples of the types of records which may be produced by the four galvanometer element oscillograph 90 when the galvanometer elements thereof are operatively connected in the arrangement of Figure 3. In such case the galvanometer element 91 will produce an indication such as represented by the line 60 of Figure 7 or the line 106 of Figure 7a, indicating the addition of the outputs of pickups 6 and 8. The galvanometer element 92 will produce an indication such as represented by the line 62 of Figure 7 or the line 107 of Figure 7a indicating a subtraction of the outputs of pickups 6 and 8. The galvanometer element 93 will produce an indication such as represented by the line 108 of Figure 7 or line 109 of Figure 7a indicating the individual output of pickup 8. The galvanometer 94 will produce an indication such as represented by a line 110 of Figure 7 or 111 of Figure 7a indicating the individual output of pickup 6. If the pickups 6 and 8 are mounted with respect to a rigid body 5 in the manner shown in Figure 5 the record 61 of Figure 7 will indicate by line 60 of Figure 7 and the record 105 of Figure 7a will indicate by line 106 the translational component of motion of the body 5 in the direction of the axis 12 in the plane 11 and said records will indicate by the line 62 or 107 the rotational component of motion of the body 5 about the axis 14 in the plane 11. Interpreting the records of Figures 7 and 7a in the light of the foregoing the lines 60 and 106 indicate a translational component of vibration of the body 5 in the direction of the axis 12 in the plane 11; the line 62 being a straight line, indicates a zero difference between the outputs of the pickups 6 and 8 and hence that there was no rotation of the body 5 in the plane 11 of the axes of the pickups 6 and 8 under the condition indicated by the record 61 of Figure 7. The line 107 of Figure 7a indicates that, under the condition indicated thereby, there was a difference between the outputs of the pickups and hence that there was a rotation of the magnitude indicated by line 107 in the plane of the axes of the pair of pickups responsible for said record 105.

It will be noted that the manner of the application of the pickup outputs to the impedance bridge 32 and of arranging the outputs of said bridge in such a manner that one output will produce an indication of the addition of the pickup voltages and the other output of the bridge will produce a subtraction of the pickup voltages, essentially involves the following arrangement. One input (33, 34,) to the impedance bridge 32 involves the connection of one terminal 35 of pickup 6 to the point 33 intermediate the arms $R_4$ and $R_1$ of one contiguous pair of the impedance arms of said bridge 32 and the connection of the other terminal 36 to the point 34 intermediate the arms $R_3$ and $R_2$ of the other contiguous pair of impedance arms of said bridge 32; a second input 37, 38 to the bridge 32 involves the connection of the terminals 39 and 40 of pickup 8 to the remaining intervening locations (37, 38) intermediate the arms of contiguous pairs of said arms ($R_4$, $R_3$ and $R_1$, $R_2$). Essentially the add and subtract outputs of the said bridge circuit are connected respectively across contiguous arms of the bridge circuit. For instance, the output $e+$ is connected across the resistor arm $R_1$ which is contiguous to the resistor arm $R_2$ across which the output $e-$ is connected.

It will be understood, of course, that the pickups 6 and 8 are independent of each other and have no direct connection with each other in any of the circuit arrangements of Figures 1, 2, or 3. It is important to note with respect to Figure 3 that the galvanometer elements 91, 92, 93 and 94 must not have any electrical connection with each other aside from that shown. On the other hand with respect to Figure 1, the galvanometer elements of oscillograph 50 may have common ground connection.

Having thus described my invention, what I claim as new and desire to secure by Letters Patent of the United States, is:

1. In electrical indicating apparatus of the class described, in combination, a plurality of independent voltage sources, means for simultaneously adding and subtracting the concurrent instantaneous values of the outputs of said sources, and means for visually indicating the concurrent instantaneous sums and differences of said outputs graphically related to a common time base.

2. In vibration analysis apparatus of the class described, in combination, a pair of vibration pick-ups mounted in a common plane on a rigid body, each of said pick-ups comprising means for producing an electrical output related to displacement of the respective pick-up, and means for simultaneously converting the combined outputs of said pick-ups into terms of electrical values respectively proportional to the concurrent translational and rotational components of motion of said body in said plane, said last means comprising an electrical impedance bridge having applied thereto the outputs of said pick-ups in such a manner that the electrical currents produced by said pick-ups will tend to flow in the same direction through one impedance arm of said bridge at any given moment and the currents produced by said pick-ups will tend to flow in opposite directions through another arm of said bridge at the same moment, and an oscillograph comprising a plurality of current responsive elements, one of said elements being responsive to flow of current through said first-mentioned arm whereby to indicate said translational component, and another of said elements being responsive to flow of current through the last-mentioned arm whereby to indicate said rotational component.

3. In an electrical vibration wave separator of the class described, in combination, a pair of vibration pick-ups mounted in a common plane on a rigid body, each of said pick-ups comprising means for producing an electrical output related to the displacement of the respective pick-up, an electrical impedance bridge having applied thereto the outputs of said pick-ups in such a manner that the electrical currents produced by the respective pick-ups will tend to flow in the same direction through one impedance arm of said bridge at any given moment and the electrical currents produced by said pick-ups will tend to flow in opposite directions through another arm of said bridge at the same moment, indicating means responsive to the flow of current through said first-mentioned arm, whereby to indicate the sum of the output voltages of said pick-ups, and second indicating means responsive to the flow of current through the last-mentioned arm whereby to indicate the difference between the output voltages of said pick-ups.

4. In electrical indicating apparatus of the class described, in combination, a pair of linear vibration pick-ups mounted on a rigid body with their axes parallel and in a common plane, each of said pick-ups comprising means for producing an electrical output proportional to displacement velocity, and means for simultaneously converting the combined output of said pick-ups into terms of electrical values proportional to the concurrent translational and rotational components of motion of said body in said plane, said last means comprising an electrical impedance bridge having the outputs of said pick-ups applied thereto in such a manner that the electrical currents produced by said pick-ups will tend to flow in the same direction through one impedance arm of said bridge at any given moment and the electrical currents produced by said pick-ups will tend to flow in opposite directions through another arm of said bridge at the same moment, and means for visually indicating the concurrent instantaneous sums and differences of said values graphically related to a common time base, said last means comprising a plurality of current responsive elements, one of said elements being responsive to flow of current through the first mentioned arm of said bridge whereby to indicate the translational component of motion of said body in said plane, and another of said elements being responsive to the flow of current through the last mentioned arm of said bridge whereby to indicate the rotational component of motion of said body in said plane, and an integrating circuit for each pick-up.

5. In electrical indicating apparatus of the class described, in combination, a pair of linear vibration pick-ups mounted on a rigid body with their axes parallel and in a common plane, each of said pick-ups comprising means for producing an electrical output proportional to displacement velocity, and means for simultaneously converting the combined outputs of said pick-ups into terms of electrical values proportional to the concurrent translational and rotational components of motion of said body in said plane, said last means comprising an electrical impedance bridge having applied thereto the outputs of said pick-ups in such a manner that the electrical currents produced by said pick-ups will tend to flow in the same direction through one impedance arm of said bridge at any given moment and the currents produced by said pick-ups will tend to flow in opposite directions through another arm of said bridge at the same moment, and an oscillograph comprising a plurality of current responsive elements, one of said elements being responsive to flow of current through said first-mentioned arm whereby to indicate said translational component, and another of said elements being responsive to flow of current through the last-mentioned arm whereby to indicate said rotational component, and an integrating circuit intermediate each pick-up and each oscillograph element.

6. In electrical indicating apparatus of the class described, in combination, a pluraltiy of independent voltage sources, an electrical impedance bridge comprising four electrical impedance arms of equal value connected in continuous circuit, one of said voltage sources having one terminal thereof connected intermediate the arms of one contiguous pair of said impedance arms and the other terminal connected intermediate the arms of the other contiguous pair of impedance arms, another of said voltage sources having its terminals connected respectively to the remaining intervening locations intermediate the arms of contiguous pairs of said arms, electrical value indicating means responsive to the flow of current through one arm of said bridge, and second electrical value indicating means responsive to the flow of current through an arm contiguous to that to which the first indicating means is responsive.

7. In an electrical vibration wave separator of the class described in combination, an electrical impedance bridge comprising four electrical impedance arms of equal value connected in continuous circuit, a vibration pick-up having its output applied to said bridge with one terminal of said pick-up output connected intermediate the arms of one contiguous pair of said impedance arms and the other terminal of said pick-up output connected intermediate the arms of the other contiguous pair of said impedance arms, a second vibration pick-up having its output applied to said bridge with the terminals of said second pick-up output connected to the remaining intervening locations intermediate the arms of contiguous pairs of arms, electrical value indicating means responsive to the flow of current through one arm of said bridge, and second electrical value indicating means responsive to the flow of current through an arm of said bridge contiguous to the arm to which the first indicating means is responsive, said vibration pick-ups each comprising means for producing an electrical value related to displacement of the respective pick-up.

8. In electrical indicating apparatus of the class described, in combination, an electrical impedance bridge, a plurality of independent electrical voltages applied to said bridge in such a manner that the electrical currents produced by said respective voltages will tend to flow in the same direction through one impedance arm of said bridge at any given moment and the electrical currents produced by said voltages will tend to flow in opposite directions through another arm of said bridge at the same moment, electrical indicating means responsive to the flow of current through the first-mentioned arm, and second electrical indicating means responsive to the flow of current through the last-mentioned arm.

9. In vibration analysis apparatus of the class described, in combination, a pair of vibration pick-ups adapted to be mounted in a common plane on a body whose vibration motion is to be analyzed, each of said pick-ups comprising means for producing an electrical output related to the displacement of said body at the point of attachment of the respective pick-up, means for simultaneously adding and subtracting the concurrent instantaneous values of the electrical outputs of said pick-ups, said last means comprising an electrical impedance bridge having the outputs of said pick-ups applied thereto in such a manner that the electrical currents produced by said pick-ups will tend to flow in the same direction through one impedance arm of said bridge at any given moment and the electrical currents produced by said pick-ups will tend to flow in opposite directions through another arm of said bridge at the same moment, and means for visually indicating the concurrent instantaneous sums and differences of said values graphically related to a common time base, said last means comprising a plurality of current responsive elements, one of said elements being responsive to flow of current through the first-mentioned arm of said bridge whereby to indicate the translational component of motion of said body in said plane, and another of said elements being responsive to the flow of current through the last-mentioned arm of said bridge whereby to indicate the rotational component of motion of said body in said plane.

10. In electrical indicating apparatus of the class described, in combination, a plurality of independent electrical voltage sources, means for simultaneously adding and subtracting the concurrent instantaneous values of the outputs of said sources, said means comprising an electrical impedance bridge having applied thereto the outputs of said sources in such a manner that the electrical currents produced by said respective voltages will flow in the same direction through one impedance arm of said bridge at any given moment and the electrical currents produced by said voltages will tend to flow in opposite directions through another arm of said bridge at the same moment, and means for visually indicating the concurrent instantaneous sums and differences of the outputs of said sources graphically related to a common time base, said last means comprising a plurality of current responsive elements, one of said elements being responsive to flow of current through the first-mentioned arm of said bridge and another of said elements being responsive to flow of current though the last-mentioned arm of said bridge.

11. In electrical indicating apparatus of the class described, a pair of vibration pick-ups, means for simultaneously adding and subtracting the outputs of said pick-ups, means for balancing the selectivities of said pick-ups, and means for selectively operatively connecting and isolating the first means when the second means is operative, said second means comprising a balancing potentiometer and another resistance of equal value, one of said pick-ups working into said potentiometer and the other pick-up working into said other resistance, and selective means operable to reverse the respective connections of said pick-ups to the respective potentiometer and resistance.

12. In vibration analysis apparatus of the class described, in combination, a pair of vibration pick-ups adapted to be mounted in a common plane on a body whose vibratory motion is to be analyzed, each of said pick-ups comprising means for producing an electrical output related to the displacement of said body at the point of attachment of the respective pick-up, means for simultaneously adding and subtracting the concurrent instantaneous values of the electrical outputs of said pick-ups, and means for visually indicating the concurrent instantaneous sums and differences of said values graphically related to a common time base.

ORVILLE R. ROGERS.